(12) United States Patent
Tanaka et al.

(10) Patent No.: US 6,712,513 B2
(45) Date of Patent: Mar. 30, 2004

(54) FLUID BEARING DEVICE

(75) Inventors: Katsuhiko Tanaka, Yamato (JP);
Ikunori Sakatani, Fujisawa (JP); Yukio Higuchi, Yokohama (JP); Takenobu Otsubo, Fujisawa (JP); Masayuki Ochiai, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/790,532

(22) Filed: Feb. 23, 2001

(65) Prior Publication Data

US 2001/0022869 A1 Sep. 20, 2001

(30) Foreign Application Priority Data

| Feb. 24, 2000 | (JP) | 2000-048212 |
| Mar. 13, 2000 | (JP) | 2000-068953 |
| Mar. 22, 2000 | (JP) | 2000-080658 |
| Jun. 6, 2000 | (JP) | 2000-168399 |

(51) Int. Cl.$^7$ .............................................. F16C 32/06

(52) U.S. Cl. ..................................................... 384/100
(58) Field of Search ................................. 384/100, 107, 384/112, 113; 350/90, 102, 103, 137

(56) References Cited

U.S. PATENT DOCUMENTS 5,453,892 A * 9/1995 Hasegawa et al. ......... 360/271.3
6,271,612 B1 * 8/2001 Tanaka et al. ................. 310/90

* cited by examiner

*Primary Examiner*—Christopher P. Schwartz
*Assistant Examiner*—Melanie Torres
(74) *Attorney, Agent, or Firm*—Crowell & Moring LLP

(57) ABSTRACT

A fluid bearing device achieves superior in wear start-stop resistance and in manufacturing ability. The fluid bearing device includes a shaft having a flange portion, a sleeve opposing to the shaft across a fluid bearing clearance of a radial fluid bearing, a counterpart member opposing to at least one of plane of the flange portion across a fluid bearing clearance of a thrust bearing. The flange portion and the sleeve portion being formed of copper alloy of mutually difference composition.

25 Claims, 5 Drawing Sheets

FLUID BEARING DEVICE

BACKGROUND OF THE INVENTION

1. Field of the Invention

The present invention relates generally to a fluid bearing device for information equipments, audio and video equipments, business machines. More particularly, the invention relates to a fluid bearing device suitable for magnetic hard disk drive (HDD), fan motor and so forth to be used in a notebook type personal computer or the like.

2. Description of the Related Art

As a typical conventional fluid bearing device of the type set forth above is a spindle motor for HDD, for example. A construction of the spindle motor will be discussed with reference to FIG. 3 which is a section showing a construction of a spindle motor as the fourth embodiment of the present invention.

In the spindle motor, a cylindrical portion 101a is vertically extended from a base 101. On the cylindrical portion 101a, a sleeve 102 is fixed. A shaft 103 is rotatably inserted into the sleeve 102. On the upper end of the shaft 103, a reversed cup-shaped hub 104 is integrally mounted. Between the shaft 103 and the sleeve 102, a dynamic pressure fluid bearing portion is interposed.

Namely, on the lower end of the shaft 103, a disk shaped thrust plate 105 is secured by press fitting. Both planar surfaces of the thrust plate 105 serves as thrust receiving surface 105s of a thrust fluid bearing S. To the thrust receiving surface 105s on the upper surface side, a lower end surface of the sleeve 102 as a counter part member is placed in opposition. The lower end surface of the sleeve 102 serves as the thrust bearing surface 102s of the thrust fluid bearing S.

On the other hand, below the thrust plate 105, a counter plate 106 as another counter part member is arranged. The counter plate 106 is fixed to the base 101. The upper surface of the counter plate 106 is placed in opposition to the thrust receiving surface 105s on the lower surface side of the thrust plate 105 to form thrust bearing surface 106s of the thrust fluid bearing S. At least one of the thrust receiving surfaces 105s and the thrust bearing surfaces 102s and 106s, a thrust fluid bearing S having a not shown herringbone type or spiral type groove for generating a dynamic pressure, is constructed.

Furthermore, on the outer peripheral surface of the shaft 103, a pair of radial receiving surface 103r is formed. In opposition to the radial receiving surface 103r, a radial bearing surface 102r is formed on the inner peripheral surface of the sleeve 102. At least one of the radial receiving surface 103r and the radial receiving surface 102r has a herringbone type groove 107 for generating dynamic pressure for example, to form a radial fluid bearing R.

On the outer periphery of the cylindrical portion 101a, a stator 108 is fixed. The stator 108 opposes with a rotor magnet 109 fixed on the lower side of the inner peripheral surface of the hub 104 over the entire circumference to form a drive motor M for driving the shaft 103 and the hub 104 for rotation in integral manner.

When the shaft 103 is driven to rotate, by pumping action of respective grooves for generating dynamic pressure of the thrust fluid bearing S and the radial fluid bearing R, dynamic pressure is generated in lubricant in bearing clearances of the fluid bearings S and R. The shaft 103 is supported in non-contact manner with the sleeve 102 and the counter plate 106.

Such conventional spindle motor is constructed with a stainless steel having high Young's modules (Vickers hardness Hv=about 270) for certainly obtaining a joint strength by press fitting of the thrust plate 105 and the shaft 103 to assure impact resistance against external shock. The sleeve 102 and the counter plate 106 as counterpart member is constructed with a copper alloy of the same composition (e.g. free cutting brass of Vickers hardness Hv=about 150). On the other hand, the groove for generating dynamic pressure of the thrust fluid bearing S is processed by etching on both planar surfaces of the thrust plate 105.

In the recent spindle motor for HDD, it has been required superior durability in starting and stopping for assuring reliability for a long period. Particularly, in case of dynamic pressure fluid bearing, it is inherent to cause mutual contact between the thrust bearing surface 106s and the thrust receiving surface 105s upon starting and stopping. Therefore, repeating of starting and stopping inherently cause wearing to increase wearing tip which can be bit in the bearing to degrade precision of rotation or in the worst case to cause failure of rotation.

Accordingly, it is important to prevent the thrust bearing surface 106s and the thrust receiving surface 105s from being damaged due to contact upon starting and stopping.

However, in the conventional thrust fluid bearing S, since the groove for generating dynamic pressure is in the thrust plate 105 which is formed with the stainless steel having high hardness, fine burr or bulge portion around the peripheral portion of the groove to be created during etching process, cannot be removed completely. Therefore, by repeating of starting and stopping, it is possible to damage the bearing surface (thrust bearing surface 102s and the thrust bearing surface 106s) of the counterpart member (sleeve 102 and counter plate 106) formed with copper alloy having low hardness.

On the other hand, since the stainless steel is not good in cutting ability, difficulty is encountered in assuring dimensional precision to cause manufacturing ability.

SUMMARY OF THE INVENTION

Therefore, the present invention is to provide a fluid bearing device solving the problem in the conventional fluid bearing and superior in wear start-stop resistance and in manufacturing ability.

In order to accomplish the above-mentioned object, a fluid bearing device comprises:

a shaft having a flange portion;

a sleeve opposing to the shaft across a fluid bearing clearance of a radial fluid bearing;

a counterpart member opposing to at least one of plane of the flange portion across a fluid bearing clearance of a thrust bearing, the flange portion and the sleeve portion being formed of copper alloy of mutually difference composition.

With the construction set forth above, the fluid bearing device according to the present invention facilitates certainly obtaining dimensional precision, achieves superior workability and mass-productivity since the flange portion and the sleeve are formed of copper alloy having high cutting ability.

Since the flange portion and the sleeve are formed with the copper alloys mutually having different compositions, high workability in formation of the dynamic pressure generating groove can be achieved for accomplishing high mass-production ability by machining the dynamic pressure generating groove on one of the flange portion and the sleeve having lower hardness. In addition, fine burr or bulged portion around the groove formed during machining of the groove, can be completely removed for successfully preventing damaging of the bearing surfaces of the member, to which the flange portion or the sleeve contact due to repeated staring and stopping of the bearing.

It is preferred that the composition of the copper alloys forming the flange portion and the sleeve are selected to that the difference of hardness in Vickers hardness Hv is greater than or equal to 50. Thus, the bearing surface of the member is hardly damaged to achieve high durability in starting and stopping. When the hardness of the flange portion and the sleeve is the same, the dynamic pressure generating groove may be formed in either one of or both of the flange portion and the sleeve.

On the other hand, in the fluid bearing device, a copper alloy forming the sleeve is a copper alloy having Vickers hardness Hv 180 or higher, and more preferably having Vickers hardness Hv 200 or higher.

Also, in the fluid bearing device of the present invention, the copper alloy can be any one of beryllium copper, high strength brass and aluminum bronze.

The copper alloy having Vickers hardness Hv 180 or higher (more preferably having Vickers hardness Hv 200 or higher) has high workability (cutting ability, plastic working or so forth) with superior sliding ability, superior in mass-production at low cost, and superior in durability in starting and stopping.

It should be noted that the copper alloy forming the sleeve is selected to the Vickers hardness Hv greater than or equal to 300 to significantly enhance durability in starting and stopping of fluid bearing device.

Furthermore, by taking beryllium copper as the copper alloy and providing age hardening process to provide Vickers hardness greater than or equal to 350, durability in starting and stopping of the fluid bearing device can be further enhanced. Beryllium has Vickers hardness Hv about 210 to 270 even before age hardening process. In this case, after forming the dynamic pressure generating groove by plastic working, such as ball rolling process, and then performs the age hardening process for providing Vickers hardness Hv greater than or equal to 350, durability in starting and stopping can be enhanced without degrading workability and mass-production environment.

The counterpart member may be formed of copper alloy.

A dynamic pressure generating groove of a depth in a range of 2 to 10 $\mu$m forming the radial fluid bearing, may be provided on an inner periphery of the sleeve. With the construction set forth above, plastic working, such as ball rolling process process, becomes easier. Of course, the groove may be machined not only by ball rolling process but also by cutting process or other methods.

For example, copper alloy having Vickers hardness Hv greater than or equal to 180 (more preferably the copper alloy having Vickers hardness Hv is 200) has higher hardness than free cutting brass (Vickers hardness Hv is about 150) to make processing difficult. Accordingly, when the depth of the groove exceeds 10 $\mu$m, load becomes significant if the groove is formed by plastic working, such as ball rolling process or the like to easily cause failure to make mass-production difficult. If the depth of the groove is less than 2 $\mu$m, the dynamic pressure generate by pumping action of the groove associating with rotation of the bearing becomes too small to obtain predetermined bearing performance. By setting the depth of the groove in the range of 2 to 10 $\mu$m, both of workability and bearing performance can be achieved. For further facilitating processing of the groove, it is further preferred to set the depth of the groove within a range of 2 to 6 $\mu$m.

It should be noted that when the copper alloy is beryllium copper, in the similar reason set forth above, the depth of the groove is to be set within a range of 2 to 8 $\mu$m, and more preferably in a range of 2 to 6 $\mu$m.

Furthermore, the fluid bearing device according to the present invention, the flange portion may be fixed to the shaft by threading. With such construction, the push-out force of the flange portion will not be restricted by longitudinal elastic modulus as in the case where the flange portion is press fitted. Therefore, sufficiently high impact resistance can be certainly provided.

Furthermore, the sleeve and the counterpart member may be mutually different in material or hardness.

Furthermore, a plane of the sleeve opposes one of planes of the flange portion across a fluid bearing clearance of the thrust bearing, a plane of the counterpart member opposes another plane of the counterpart member across a fluid bearing clearance of the thrust bearing, and at least one of the plane of the sleeve and the plane of the counterpart member is provided surface treatment.

By this, in comparison with that both of the sleeve and the counterpart member are formed with the material having high hardness and high sliding ability or by providing surface process to achieve higher hardness and higher sliding ability, substantially comparable durability in starting and stopping can be achieved with lower cost.

A fluid bearing clearance of the radial fluid bearing and a fluid bearing clearance of the thrust fluid bearing are filled with lubricant containing 0.1 to 5.0 Wt % of antioxidant.

With such construction, reaction between the lubricant and copper alloy can be restricted to make it possible to reduce reduction amount of the lubricant due to evaporation at high temperature. If the content of the antioxidant less than 0.1 Wt %, the foregoing effect becomes insufficient. If the content of the antioxidant exceeds 5 Wt %, viscosity of the lubricant becomes different from that of the base oil.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms a spindle motor as the preferred embodiment of a fluid bearding device of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

First Embodiment

Figure 1:
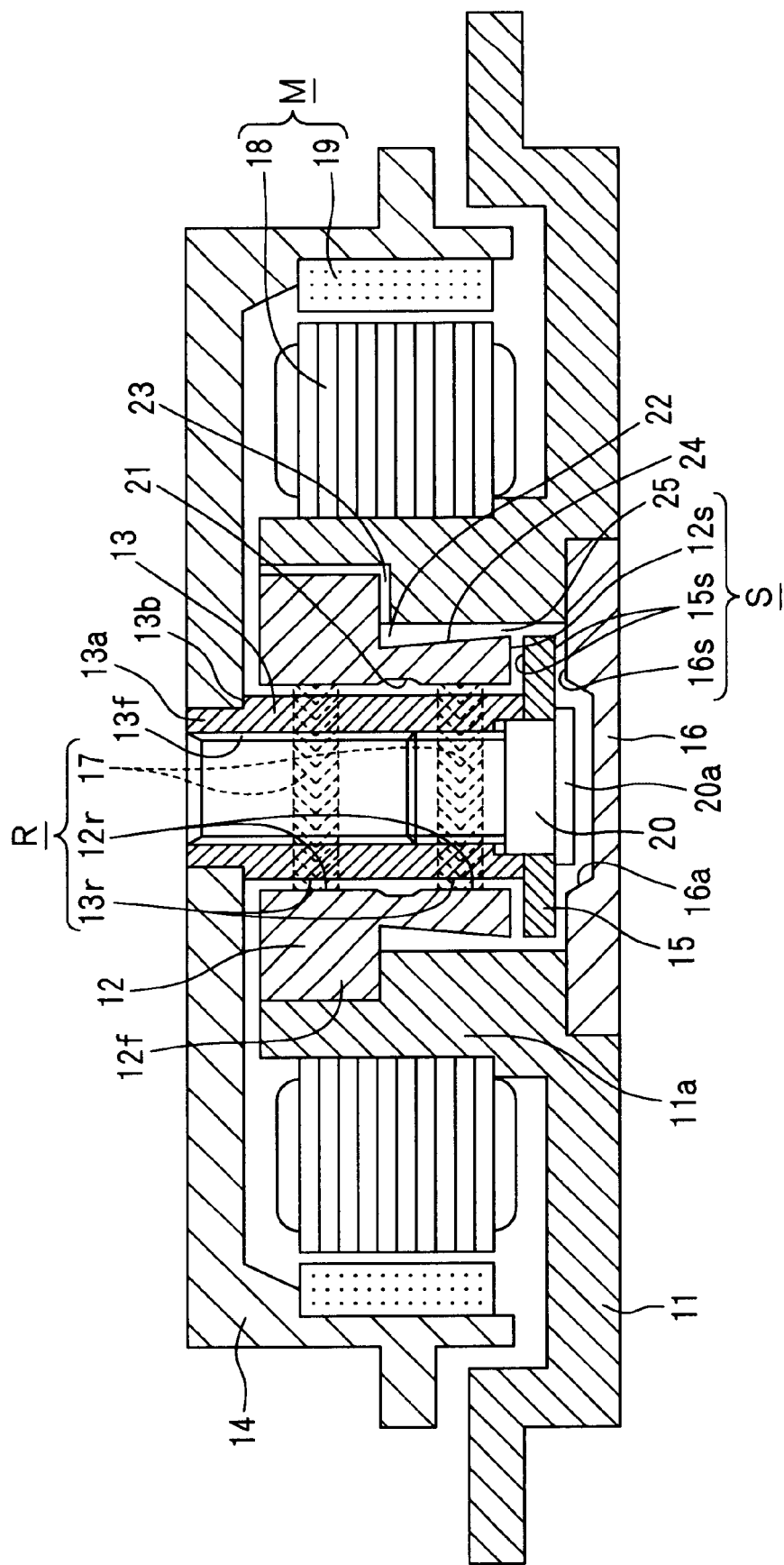
FIG. 1 is a section showing a construction of a spindle motor as the first embodiment of a fluid bearing device according to the present invention.

FIG. 1 is a section of a spindle motor as the first embodiment of a fluid bearing device according to the present invention.

On an inside of a cylindrical portion 11a extending vertically at the center portion of a base 11, a cylindrical sleeve 12 with a flange formed with copper alloy (Vickers hardness Hv=264) is inserted and is integrally fixed to the cylindrical portion 11a with the flange 12f.

Then, within the sleeve 12, a hollow shaft 13 is inserted. The shaft 13 is formed with a female thread 13f on the inner peripheral surface. The upper end portion 13a of the shaft 13 is formed to have smaller diameter than other portion. By press fitting the smaller diameter upper end portion 13a into a hole provided at the center portion of a shallow reversed cup-shaped hub 14, the shaft 13 and the hub 14 are fixed integrally. A shoulder 13b at the boundary between the smaller diameter upper end portion 13a and the larger diameter remaining portion is contacted with the lower surface of the hub 14. Therefore, the shaft 13 and the hub 14 are fixed with each other with certainly providing a sufficient impact resistance. It should be noted that the shaft 13 can be bar shape (solid shaft) instead of hollow.

On the outer periphery of the cylindrical portion 11a of the base 11, a stator 18 is fixed. On the inner peripheral surface of the hub 14, a rotor magnet 19 is fixed to circumferentially oppose with a gap for forming a drive motor M.

On the lower end of the shaft 13 extending from the lower end of the sleeve 12, a disk shaped thrust plate 15 formed of copper alloy (Vickers hardness Hv=90) is fixed. It should be noted that the thrust plate 15 corresponds to the flange portion as a component of the present invention. In the shown embodiment, by threading engagement of the fastening screw 20 with the female thread 13f formed on the inner periphery of the shaft 13, the thrust plate 15 is mounted on the shaft 13.

Since the thrust plate 15 is rigidly secured on the shaft 13 by thread engagement, sufficient joining strength can be certainly provided. Also, different from the case of mounting by press fitting, copper alloy (good cutting ability) having low Young's module can be used as thrust plate 15. As a shape of a head portion 20a of the fastening screw 20, is not limited to flat head shape but can be a round head of a round head machine screw, a counter shunk head of a countersunk head machine screw or so forth.

The lower surface of the thrust plate 15 opposes an upper surface of a counter plate 16 of copper alloy (Vickers hardness Hv=264) which is mounted on the base 11. Upon stopping, opposing surfaces contact with each other.

At the center portion (beneath the shaft 13) of the counter plate 16, a recess 16a for accommodating the head portion 20a of the fastening screw 20 is formed. With this construction, it becomes unnecessary to mount the fastening screw 20 on the thrust plate 15 in embedded form. Thus machining of the thrust plate 15 is facilitated.

When the fastening screw 20 fastening the thrust plate 15 is mounted in a form embedding the head 20a or when the thrust plate 15 is fixed to the shaft 13 by press fitting, the recess 16a is unnecessary to provide. However, when the thrust plate 15 is fixed to the shaft 13 by press fitting, a push-out force is restricted due to longitudinal elastic modulus of the material of the thrust plate 15. Therefore, thread fastening is more suitable for assuring impact resistance.

Both of upper and lower flat surfaces of the thrust plate 15 serves as thrust receiving surface 15s. The lower end surface of the sleeve 12 as one of the counterpart member opposing to the upper surface side thrust receiving surface 15s and the upper surface of the counter plate 16 as the other counterpart member opposing to the lower surface side thrust receiving surface 15s serve as thrust bearing surfaces 12s and 16s. the thrust fluid bearing S having the herringbone type groove (not shown) for generating dynamic pressure is formed by the thrust receiving surfaces 15s among the mutually opposing thrust receiving surfaces 15s and the thrust bearing surfaces 12s and 16s. Namely, among the sleeve 12, the counter plate 16 and the thrust plate 15, the groove for generating the dynamic pressure is provided on the thrust plate 15 having the low Vickers hardness Hv.

A machining method for providing the groove on both planar surfaces (thrust receiving surfaces 15s) of the thrust plate 15 is not particularly limited and can be any of plastic working, cutting working, chemical etching, electrolytic etching and so forth are considered. It should be noted that when the copper alloy having low hardness is used for forming the thrust plate 15, plastic working by coining process can be facilitated to be advantageous for superior manufacturing ability. It should be noted that since the sleeve 12 or counter plate 16 are required strength, material having higher hardness is preferred.

On the other hand, on the outer peripheral surface of the shaft 13, a pair of radial receiving surfaces 13r located axially spaced positions. Opposing to these radial receiving surfaces 13r, radial bearing surfaces 12r are formed on the inner periphery of the sleeve 12. On the radial bearing surfaces 12r, elbow shaped herringbone type dynamic pressure generating grooves 17 are formed to form the radial fluid bearing R. The dynamic pressure generating groove 17 of the radial fluids bearing R is formed into inward asymmetric groove pattern, in which the length of the groove is shorter on the inner side than the outer side for preventing flowing out of the lubricant within the bearing clearance during rotation.

It should be noted that the dynamic pressure generating groove 17 may be formed on the radial receiving surface 13r or on both of the radial bearing surface 12r and the radial receiving surface 13r.

On the other hand, in order to make small the torque of the spindle motor, a circumferential groove 21 formed with a tapered circumferential groove gradually reducing clearance toward the bearing clearance of the radial fluid bearing R, is provided on the inner peripheral surface of the sleeve 12 (or on the outer peripheral surface of the shaft 13 or both of the inner peripheral surface of the sleeve 12 and the outer peripheral surface of the shaft 13) between the upper and lower radial fluid bearings R.

Furthermore, between the outer periphery of the sleeve 12 and the inner periphery of the cylindrical portion 11a, an annular clearance is disposed to form a lubricant reservoir 22. On the upper portion of the lubricant reservoir 22, air communication hole 23 is formed. The air communication hole 23 extends horizontally from the uppermost position of the lubricant reservoir 22 and then bent upwardly to open at the upper end surface of the sleeve 12. Namely, the air communication hole 23 is provided for forming an axial slit in the engaging surface with the sleeve 12 of the cylindrical portion 11a. Of course, the air communication hole 23 may be formed to extend vertically from the uppermost portion of the lubricant reservoir 22 to open in the upper end surface of the sleeve 12.

On the other hand, the outer peripheral surface of the sleeve 12 forming the inner surface of the lubricant reservoir 22 is a tapered surface 24 for narrowing the toward the lower thrust fluid bearings. The tapered surface 24 is not necessarily formed on the outer peripheral surface of the sleeve 12 but can be formed on the inner peripheral surface of the cylindrical portion 11a or may be formed on both of the outer peripheral surface of the sleeve 12 and the inner peripheral surface of the cylindrical portion 11a. It should be noted that the taper surface 24 may be tapered up to the position where the counter plate 16 is placed.

Then, a portion of the lubricant reservoir 22 communicating with the lower fluid bearing serves as a lubricant supply passage 25 having a clearance equal to or slightly greater than bearing clearance so that the lubricant can be easily introduced into the bearing clearance by capillarity.

Filling of the lubricant to the spindle motor is performed through the air communication hole 23 during assembling of the spindle motor. However, if a through hole extending through thickness direction is formed through the center of the counter plate 16, lubricant may be filled through the through hole after assembling whole spindle motor. Filled lubricant fills respective bearing clearance of the thrust fluid bearing S and radial fluid bearing R, and extra amount of lubricant is stored in the lubricant reservoir 22 and is held on the tapered surface 24 by capillarity based on surface tension. Accordingly, when the spindle motor is placed in up-side down attitude during transportation or use, the lubricant in the lubricant reservoir 22 flows out.

On the other hand, since the clearance of the lubricant reservoir 22 is gradually narrowed toward the lower lubricant supply passage 25 by the taper surface 24, lubricant splashed by external impact may be naturally collected in the lubricant reservoir 22 on the side of the lubricant supply passage 25, where the clearance is narrower unless flowing out externally.

When the spindle motor is assembled as set forth above, amount residual bubble in the bearing clearance can be little. Also, in order to assure degassing of bubble, it may be possible to place the spindle motor within a vacuum vessel for degassing after filling the lubricant, if necessary.

When the hub 14 and the shaft 13 are integrally driven for rotation mounting a not shown magnetic hard disk as rotatingly driven body on an outer periphery portion by a driving motor M, by a pumping action of respective dynamic pressure generating groove of the thrust fluid bearing S and the radial fluid bearing R, dynamic pressure is generated in the lubricant filled in the bearing clearance of respective fluid bearings S and R to support the shaft 13 non contact with the sleeve 12 and the counter plate 16.

Associating with rotation, even when residual bubble is present in the bearing clearance, the residual bubble can be quickly discharged to the ambient air through the air communication hole 23.

When operation is extended for a long period to cause lacking of lubricant held in the bearing clearance for evaporation and flying in various direction, lubricant held in the lubricant reservoir 22 by capillarity based on surface tension is sucked as guided by the tapered surface 24 depending upon lacking amount until the bearing clearance is filled by lubricant. Namely, associating with reduction of the lubricant in the bearing clearance, the lubricant is sucked into the narrower bearing clearance by capillarity through the lubricant supply passage 25 and becomes stable at a position where surface tension of the tapered surface 24 of the lubricant reservoir 22 balances. Thus, consumed amount of the lubricant can be filled automatically.

With the shown embodiment, since the clearance of the lubricant reservoir 22 is in taper form, lubricant is sucked into the narrower clearance by surface tension. On the other hand, residual bubble convoluted upon assembling is separated toward the wider side of clearance. Accordingly, lubricant not containing bubble can be automatically and certainly supplied to respective bearing clearance. Also, since respective bearing clearance is communicated with the lubricant reservoir 22 to be constantly filled by lubricant. Thus, spindle motor which is highly reliable and highly durable, can be obtained even used for a long period.

On the other hand, the shown embodiment of the spindle motor is constructed with the sleeve 12 and the counter plate 16 formed of copper alloy having Vickers hardness Hv=264, and with the thrust plate 15 formed of copper alloy having Vickers hardness Hv=90. Then, the dynamic pressure generating groove is provided on the thrust plate 15 having smaller Vickers hardness Hv.

Copper alloy has good cutting workability, and further, the dynamic pressure generating groove is processed on the copper alloy having lower hardness to facilitate obtaining of dimension precision, high work ability, and superior manufacturing ability. On the other hand, fine burr or bulged portion around the groove caused by machining of the groove, can be completely removed. Therefore, damaging of the thrust bearing surfaces 12s and 16s of the sleeve 12 and the counter plate 16 by repetition of starting and stopping of the bearing can be successfully prevented.

Next, in the spindle motor similar to the foregoing embodiment, the counterpart member (sleeve 12, counter plate 16) and the thrust plate 15 formed of various kinds of metals were prepared and test was performed for evaluating degree of damage of the thrust bearing surface by repeated start and stop.

Kinds of used metals and results of evaluation are shown in the following table 1.

TABLE 1

| | THRUST PLATE | | COUNTERPART MEMBER[*1] | | |
|---|---|---|---|---|---|
| | MATERIAL | HARD-NESS[*3] | MATERIAL | HARD-NESS | *JDM[*2] |
| EM. 1 | Copper Alloy A | 90 | Copper Alloy B | 98 | ○ |
| EM. 2 | Copper Alloy A | 90 | Copper Alloy C | 264 | ◉ |
| EM. 3 | Copper Alloy A | 90 | Copper Alloy C[*4] | 390 | ◉ |
| EM. 4 | Copper Alloy D | 187 | Copper Alloy C | 264 | ◉ |
| EM. 5 | Copper Alloy A | 90 | Copper Alloy E | 180 | ◉ |
| EM. 6 | Copper Alloy A | 90 | Copper Alloy F | 196 | ◉ |
| EM. 7 | Copper Alloy A | 90 | Copper Alloy G | 256 | ◉ |

TABLE 1-continued

| | THRUST PLATE | | COUNTERPART MEMBER[*1] | | |
|---|---|---|---|---|---|
| | MATERIAL | HARD-NESS[*3] | MATERIAL | HARD-NESS | *JDM[*2] |
| COMP. 1 | Stainless | 261 | Copper Alloy | 153 | X |
| COMP. 2 | Copper Alloy A | 90 | Copper Alloy A | 90 | X |

(*JDM: JUDGEMENT)
[*1]Sleeve and Counter plate
[*2]Degree of Damage by Starting and Stopping
◎: Good  ○: Slight  X: Damaged
[*3]Vickers Hardness Hv
[*4]Provided Aging Treatment In case of the comparative example 1 (COMP. 1) as the prior art, the thrust plate is formed with stainless steel having high hardness and harder than copper alloy forming the counterpart member. Therefore, damage on the thrust bearing surface provided on the counterpart member becomes significant.

In contrast to this, the embodiments 1 to 7 (Ex. 1 to Ex. 7) are constructed with the thrust plates and the counterpart members of different copper alloy having different compositions. Furthermore, the dynamic pressure generating groove is provided on the thrusting plate having lower hardness (softer). As a result, damage of the thrust bearing surface is light. Particularly, it can be judged that when a difference of the Vickers hardness of the thrust plate and the counterpart member is greater than or equal to 50 as in the embodiments 2 to 7, possibility of causing damage is further reduced to achieve higher durability in starting and stopping.

It should be noted that when the thrust plate and the counterpart member are formed with the same material (the same hardness) as in the comparative example 2 (Comp. 2), it has been found that damage can be caused on both of the thrust receiving surface and the thrust bearing surface upon starting and stopping for same kind of metal.

Second Embodiment

Figure 2:
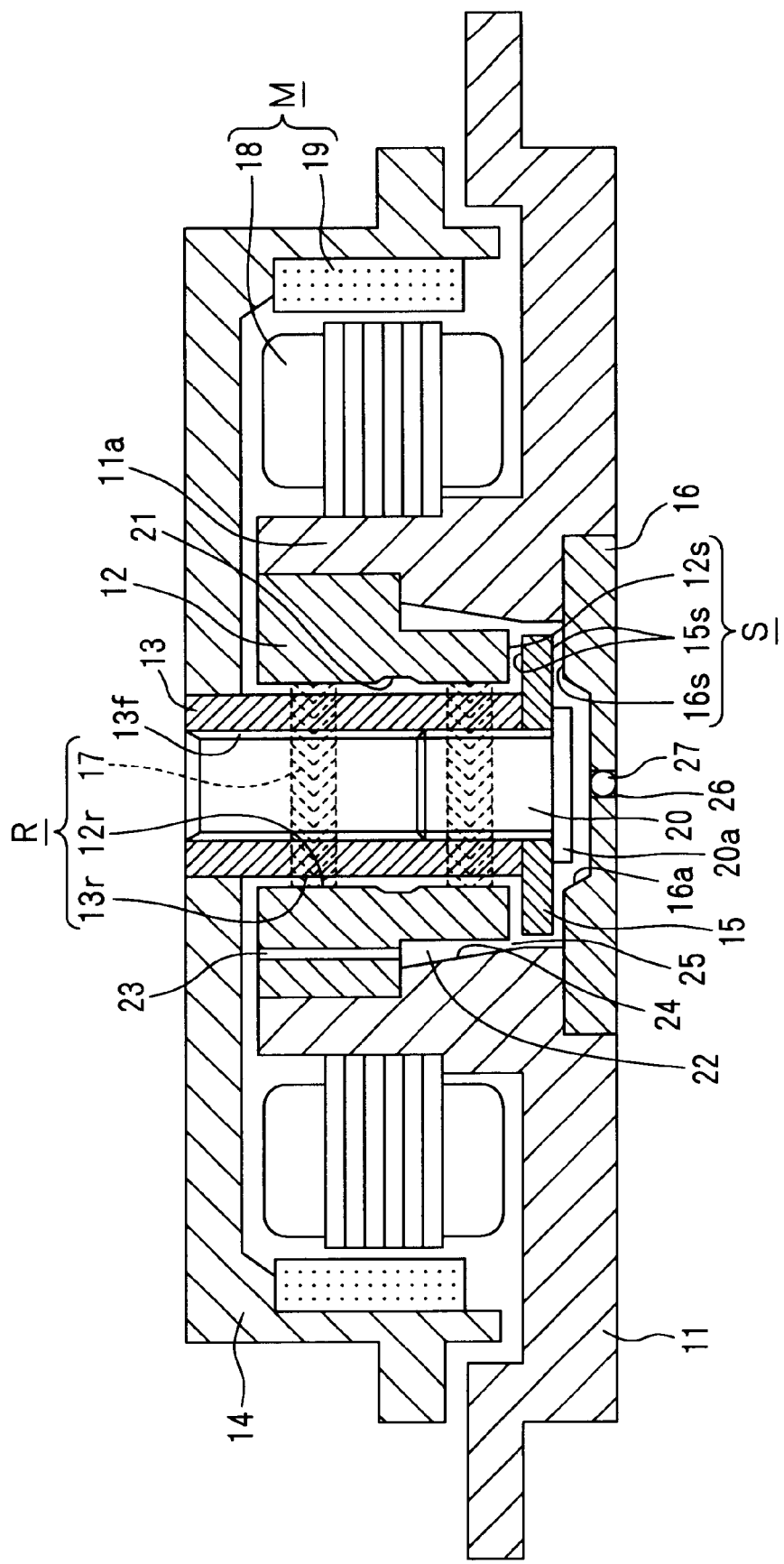
FIG. 2 is a section showing a construction of a spindle motor as the second and third embodiments of a fluid bearing device according to the present invention.

FIG. 2 is a section of the spindle motor as the second embodiment of the fluid bearing device according to the present invention. In FIG. 2, like components to those shown in FIG. 1 will be identified by like reference numerals.

On an inside of a cylindrical portion 11a extending vertically at the center portion of a base 11, a cylindrical sleeve 12 with a flange formed with copper alloy having Vickers hardness Hv greater than or equal to 180 (more preferably, formed with copper alloy having Vickers hardness Hv greater than or equal to 200) is inserted and is integrally fixed to the cylindrical portion 11a with the flange. As the copper alloy, for example, high strength brass (Chuetsu Gokin K. K.: Tradename CSM-3E (Vickers hardness Hv 180), CSM-3ME (Vickers hardness Hv 196), P-31BE (Vickers hardness Hv 254) and so forth), aluminum bronze (Mitsubishi Material K. K.: Tradename Arms Bronze 110 (Vickers hardness Hv 306), beryllium copper (Vickers hardness Hv greater than or equal to 200) and so forth) and the like.

Then, within the sleeve 12, a hollow shaft 13 is inserted. The shaft 13 is formed with a female thread 13f on the inner peripheral surface. On the upper end portion of the shaft 13, the shallow reversed cup-shaped hub 14 is fixed integrally. The shaft 13 is not necessarily hollow but can be solid. On the outer periphery of the cylindrical portion 11a of the base 11, a stator 18 is fixed. On the inner peripheral surface of the hub 14, a rotor magnet 19 is fixed to circumferentially oppose with a gap for forming a drive motor M.

On the lower end of the shaft 13 extending from the lower end of the sleeve 12, the disk shaped thrust plate 15 is fixed. In the shown embodiment, by threading engagement of the fastening screw 20 with the female thread 13f formed on the inner periphery of the shaft 13, the thrust plate 15 is mounted on the shaft 13. The lower surface of the thrust plate 15 opposes an upper surface of a counter plate 16. Upon stopping, opposing surfaces contact with each other. The thrust plate 15 corresponds to the flange portion as component of the present invention.

At the center portion (beneath the shaft 13) of the counter plate 16, a recess 16a for accommodating the head portion 20a of the fastening screw 20 is formed. With this construction, it becomes unnecessary to mount the fastening screw 20 on the thrust plate 15 in embedded form. Thus machining of the thrust plate 15 is facilitated.

When the fastening screw 20 fastening the thrust plate 15 is mounted in a form embedding the head 20a or when the thrust plate 15 is fixed to the shaft 13 by press fitting, the recess 16a is unnecessary to provide. However, when the thrust plate 15 is fixed to the shaft 13 by press fitting, a push-out force is restricted due to longitudinal elastic modulus of the material of the thrust plate 15. Therefore, thread fastening is more suitable for assuring impact resistance Both of upper and lower flat surfaces of the thrust plate 15 serves as thrust receiving surface 15s. The lower end surface of the sleeve 12 as one of the counterpart member opposing to the upper surface side thrust receiving surface 15s and the upper surface of the counter plate 16 as the other counterpart member opposing to the lower surface side thrust receiving surface 15s serve as thrust bearing surfaces 12s and 16s. The thrust fluid bearing S having the herringbone type groove (not shown) for generating dynamic pressure, is formed on at least one of the thrust receiving surface and the thrust bearing surface.

On the other hand, on the outer peripheral surface of the shaft 13, a pair of radial receiving surfaces 13r located axially spaced positions. Opposing to these radial receiving surfaces 13r, radial bearing surfaces 12r are formed on the inner periphery of the sleeve 12. On the radial bearing surfaces 12r, elbow shaped herringbone type dynamic pressure generating grooves 17 are formed to form the radial fluid bearing R. The dynamic pressure generating groove 17 of the radial fluid bearing R is formed into inward asymmetric groove pattern, in which the length of the groove is shorter on the inner side than the outer side for preventing flowing out of the lubricant within the bearing clearance during rotation.

It should be noted that the dynamic pressure generating groove 17 may be formed on the radial receiving surface 13r or on both of the radial bearing surface 12r and the radial receiving surface 13r.

On the other hand, in order to make small the torque of the spindle motor, a circumferential groove 21 formed with a tapered circumferential groove gradually reducing clearance toward the bearing clearance of the radial fluid bearing R, is provided on the inner peripheral surface of the sleeve 12 (or on the outer peripheral surface of the shaft 13 or both of the inner peripheral surface of the sleeve 12 and the outer peripheral surface of the shaft 13) between the upper and lower radial fluid bearings R.

Furthermore, between the outer periphery of the sleeve 12 and the inner periphery of the cylindrical portion 11a, an annular clearance is disposed to form a lubricant reservoir 22. On the upper portion of the lubricant reservoir 22, air communication hole 23 is formed. The air communication hole 23 extends from the uppermost position upwardly to open at the upper end surface of the sleeve 12. Of course, the air communication hole 23 is provided for forming an axial slit in the engaging surface with the sleeve 12 of the cylindrical portion 11a.

On the other hand, on the inner peripheral surface of the cylindrical portion 11a forming the inner surface of the lubricant reservoir 22 is formed into a tapered surface narrowing the clearance toward the thrust fluid bearing S. Of course, the tapered surface 23 is not necessarily formed on the inner periphery of the cylindrical portion but can be formed on the outer periphery of the sleeve 12. In the alternative, the tapered surface may be formed on both of the inner periphery of the cylindrical portion and the outer periphery of the sleeve 12. It should be noted that the tapered surface 24 may be tapered up to the position of the counter plate 16.

Then, a portion of the lubricant reservoir 22 communicating with the lower fluid bearing serves as a lubricant supply passage 25 having a clearance equal to or slightly greater than bearing clearance so that the lubricant can be easily introduced into the bearing clearance by capillarity.

Filling of the lubricant to the spindle motor is performed through the through hole 26 provided at the center of the counter plate 16 after assembling whole spindle motor. Filled lubricant fills respective bearing clearance of the thrust fluid bearing S and radial fluid bearing R, and extra amount of lubricant is stored in the lubricant reservoir 22 and is held on the tapered surface 24 by capillarity based on surface tension. Accordingly, when the spindle motor is placed in up-side down attitude during transportation or use, the lubricant in the lubricant reservoir 22 flows out.

On the other hand, since the clearance of the lubricant reservoir 22 is gradually narrowed toward the lower lubricant supply passage 25 by the taper surface 24, lubricant splashed by external impact may be naturally collected in the lubricant reservoir 22 on the side of the lubricant supply passage 25, where the clearance is narrower unless flowing out externally.

After filing the lubricant in the spindle motor, by press fitting a ball 27 into the through hole 26, the through hole 26 is sealed. It should be noted that the ball 27 can be a cylindrical member or the like.

When the spindle motor is assembled as set forth above, amount residual bubble in the bearing clearance can be little. Also, in order to assure degassing of bubble, it may be possible to place the spindle motor within a vacuum vessel for degassing after filling the lubricant, it necessary. It should be noted that for preventing drop down of the press fitted ball 27 by external impact or fluid leakage through a gap in the ball press fitting portion, a seat member or adhesive seal member (not shown) or the like may be bonded after press fitting the ball 27.

When the hub 14 and the shaft 13 are integrally driven for rotation mounting a not shown magnetic hard disk as rotatingly driven body on an outer periphery portion by a driving motor M, by a pumping action of respective dynamic pressure generating groove of the thrust fluid bearing S and the radial fluid bearing R, dynamic pressure is generated in the lubricant filled in the bearing clearance of respective fluid bearings S and R to support the shaft 13 non contact with the sleeve 12 and the counter plate 16.

Associating with rotation, even when residual bubble is present in the bearing clearance, the residual bubble can be quickly discharged to the ambient air through the air communication hole 23.

When operation is extended for a long period to cause lacking of lubricant held in the bearing clearance for evaporation and flying in various direction, lubricant held in the lubricant reservoir 22 by capillarity based on surface tension is sucked as guided by the tapered surface 24 depending upon lacking amount until the bearing clearance is filled by lubricant. Namely, associating with reduction of the lubricant in the bearing clearance, the lubricant is sucked into the narrower bearing clearance by capillarity through the lubricant supply passage 25 and becomes stable at a position where surface tension of the tapered surface 24 of the lubricant reservoir 22 balances. Thus, consumed amount of the lubricant can be filled automatically.

With the shown embodiment, since the clearance of the lubricant reservoir 22 is in taper form, lubricant is sucked into the narrower clearance by surface tension. On the other hand, residual bubble convoluted upon assembling is separated toward the wider side of clearance. Accordingly, lubricant not containing bubble can be automatically and certainly supplied to respective bearing clearance. Also, since respective bearing clearance is communicated with the lubricant reservoir 22 to be constantly filled by lubricant. Thus, spindle motor which is highly reliable and highly durable, can be obtained even used for a long period.

The shown embodiment of the spindle motor has the sleeve 12 formed of copper alloy having Vickers hardness Hv greater than or equal to 180 (more preferably, Vickers hardness Hv greater than or equal to 200). On the inner peripheral surface of the sleeve 12, a plurality of dynamic pressure generating groove 17 as herringbone type grooves are processed. Formation of the groove on the inner peripheral surface of the sleeve 12 is performed by plastic working, such as ball rolling process or the like, superior in manufacturing ability. Ball rolling process is a method for processing by driving a rolling jig holding a plurality of steel balls on the hollow outer cylinder fitted over the outer periphery of the shaft into the sleeve 12. Namely, after cutting process of the sleeve on a lathe, a main shaft of the lathe is slowly rotated in forward and reverse directions with driving the rolling jig into the sleeve to form the herringbone (elbow shape) groove on the inner peripheral surface. Subsequently, as required, bulged portion around the groove is removed by finishing process, such as finishing cutting or a ball vanishing and so forth. Of course, not on the lathe, the herringbone type groove may be rolled by driving the rolling jig into the sleeve held at fixed position with driving the jig in forward and reverse direction using a rolling machine.

When the dynamic pressure generating groove 17 is formed by ball rolling process on the inner peripheral surface of the sleeve formed with copper alloy having Vickers hardness greater than or equal to 180 (more preferably, Vickers hardness Hv greater than or equal to 200), processing is difficult for higher hardness in comparison with free cutting brass (Vickers hardness Hv about 150). Accordingly, the depth of the groove 17 is shallower than the conventional groove and is in a range of 2 to 10 $\mu$m, preferably in a range of 2 to 6 $\mu$m. Thus, fluid bearing which is relatively easy to form groove and has high bearing performance, can be obtained.

From the result of durability test of starting and stopping, when the hardness of the copper alloy forming the sleeve 12 is set to have Vickers hardness Hv higher than or equal to 300, it has been found to significantly enhance durability in starting and stopping of radial fluid bearing R. Furthermore, when beryllium copper is selected as copper alloy with age hardening process to provide Vickers hardness Hv higher than or equal to 350, it has been found to enhance durability in starting and stopping of the radial fluid bearing R.

When hardness of the copper alloy becomes higher, it becomes difficult to remove by ball rolling process bulged portion around the groove caused during plastic working of the dynamic pressure generating groove and becomes necessary to cutting the bulged portion away by lathe. Namely, after cutting the sleeve 12 into a predetermined dimension on the lathe, groove formation is performed on the inner peripheral surface of the sleeve 12. Subsequently, the bulged portion around the groove is cut away on the lathe. Thus, shape precision on the inner peripheral surface of the sleeve 12 can be easily obtained. Also, the sleeve 12 may achieve high coaxial level of inner and outer peripheral surfaces and high dimensional precision.

It should be noted that when beryllium copper is selected as copper alloy and age hardening process is provided for the copper alloy to provide Vickers hardness Hv higher than or equal to 350, after preliminarily forming the groove on the inner peripheral surface of the sleeve 12 by ball rolling process, age hardening process may be provided to provide higher hardness. Then, processing of the sleeve 12 can be facilitated to achieve superior manufacturing ability.

At this time, by performing age hardening process is performed (for example, maintain at 315° C. for two hours), dimension should be varied due to shrinkage of the material. Therefore, it becomes necessary to machining process has to be done with preliminarily take the predetermined dimensional variation into account. Namely, for example, the internal diameter is preliminarily machined to be larger than the desired dimension with taking the shrinkage amount by the age hardening process, and groove formation and removal of bulged portion around the groove are performed. It should be noted that variation of the internal diameter by age hardening process is about 0.06%. Therefore, influence of shrinkage for the depth of the groove can be practically ignorable.

The material of the shaft 13 is not specified and any material achieving high hardness and corrosion resistance. However, material which is prepared by heat treatment for martensic stainless steel or austenitic stainless steel for hardening the surface, or by prepared by surface treatment on martensic stainless steel or austenitic stainless steel by plating or DLC (diamond like carbon) layer may be preferred. Also, as a material for the thrust plate 15, copper alloy which can be easily process by plastic working by coining, is suitable.

It should be noted that when the counter plate 16 is formed of copper alloy having Vickers hardness Hv greater than or equal to 180 (more preferably copper alloy having Vickers hardness Hv greater than or equal to 200), durability in starting and stopping of the thrust fluid bearing S can be improved. When the fluid bearing is designed to offset the rotor magnet 19 of the drive motor M and the axial positions of the stator 18 for acting drawing force to make the end face of the sleeve 12 to bear the most of the axial load. Then the little load act on the side of the counter plate 16, the material of the counter plate 16 is not limited to the copper alloy having Vickers hardness Hv greater than or equal to 180, but can be free-cutting brass, lead-bronze cast, phosphor bronze and other normal copper alloy may be used.

On the other hand, it is preferred that the lubricant contains 0.1 to 5 Wt % of antioxidant. The reason is that through a long period continuous revolution test performed for the shown embodiment of the spindle motor, the lubricant (e.g. diester oil, such as DOS, DOA, DIDA or the like or mixture of two or more of those) should react with the copper alloy to cause change in color or to cause degradation. By containing 0.1 to 5.0 Wt % of antioxidant is added to the lubricant, reaction with the copper alloy can be restricted to enable suppression of the reduction in amount of the lubricant due to evaporation at high temperature range.

As antioxidant, Irganox, phenol type antioxidant (e.g. hindered phenol compound or the like) and so forth may be used.

When the additive amount of the antioxidant is less than 0.1 Wt %, effect by addition of antioxidant can be insufficient. On the other hand, when the additive amount of the lubricant exceeding 5 Wt %, viscosity of the lubricant be cause different from that of the base fluid (base oil).

As set forth above, with shown embodiment of the spindle motor, since the sleeve 12 is formed with the copper alloy having Vickers hardness Hv greater than or equal to 180 (more preferably Vickers hardness Hv greater than or equal to 200), which is superior in workability and has high hardness with sliding ability, it achieves superior workability in manufacturing at low cost, and further achieves superior durability in starting and stopping.

On the other hand, since the depth of the dynamic pressure generating groove is set in a range of 2 to 10 $\mu$m, machining of the dynamic pressure generating groove 17 by plastic working, such as ball rolling process or the like can be facilitated.

Furthermore, by providing Vickers hardness Hv greater than or equal to 300, more preferably greater than or equal to 350 for the sleeve 12 forming the copper alloy, start-stop durability can be improved.

Third Embodiment

The construction of the third embodiment of the spindle motor is similar to the construction of the second embodiment of the spindle motor except that the sleeve 12 is formed with beryllium copper. Therefore, in the following disclosure, discussion for common components will be omitted for avoiding redundant discussion and whereby for keeping the disclosure simple enough to facilitate clear understanding of the invention.

The shown embodiment of the spindle motor has the sleeve 12 formed with beryllium copper. On the inner peripheral surface of the sleeve 12, a plurality of dynamic pressure generating grooves 17 in a form of herringbone type grooves are formed. Machining of the grooves on the inner peripheral surface of the sleeve 12 may be performed by plastic working, such as ball rolling process or the like, superior in manufacturing ability.

When the dynamic pressure generating groove is formed on the inner peripheral surface of sleeve 12 formed of beryllium copper by way of ball rolling process, since beryllium copper has Vickers hardness Hv about 210 to 270 harder than that of free-cutting brass (Vickers hardness Hv about 150) even before age hardening process, machining is difficult. Accordingly, the depth of the groove has to be set shallower in a range of 2 to 8 $\mu$m, preferably in a range of 2 to 6 $\mu$m.

In case of the sleeve 12 formed of beryllium copper, if the depth of the dynamic pressure generating groove 17 is set in a range of 2 to 6 $\mu$m, the fluid bearing which is relatively easily to machine the groove and achieves superior bearing performance, can be obtained.

On the other hand, from the result of starting and stopping test, it has been found that start-stop durability of the radial fluid bearing can be improved by providing age hardening process for the sleeve 12 formed of beryllium copper to providing Vickers hardness Hv greater than or equal to 300, preferably greater than or equal to 350. In the similar reason to the case of the second embodiment, it is preferred that hardness is increased by providing age hardening process after preliminarily performing machining of groove on the inner peripheral surface of the sleeve 12 by ball rolling process, to facilitate machining to achieve superior mass-production ability.

At this time, by performing age hardening process is performed (for example, maintain at 315° C. for two hours), dimension should be varied due to shrinkage of the material. Therefore, it becomes necessary to machining process has to be done with preliminarily take the predetermined dimensional variation into account similarly to the second embodiment.

The material of the shaft 13 is not specified and any material achieving high hardness and corrosion resistance. However, material which is prepared by heat treatment for martensic stainless steel or austenitic stainless steel for hardening the surface, or by prepared by surface treatment on martensic stainless steel or austenitic stainless steel by plating or DLC (diamond like carbon) layer may be preferred. When austenitic stainless steel or copper alloy having different composition to that of the sleeve and having higher hardness, thermal expansion coefficients thereof is close to that of beryllium copper, variation of bearing clearance can be small even at high temperature. Also, as a material for the thrust plate 15, copper alloy which can be easily process by plastic working by coining, is suitable.

It should be noted that when the counter plate 16 is formed of beryllium copper, start-stop durability of the thrust fluid bearings can be improved. When the fluid bearing is designed to offset the rotor magnet 19 of the drive motor M and the axial positions of the stator 18 for acting drawing force (acting upward drawing force in FIG. 2) to make the end face of the sleeve 12 (thrust bearing surface 12s) to bear the most of the axial load. Then the little load act on the side of the counter plate 16, the material of the counter plate 16 is not limited to the copper alloy but can be free-cutting brass, lead-bronze cast, phosphor bronze and other normal copper alloy may be used.

As set forth above, with the shown embodiment of the spindle motor, since the sleeve 12 is formed with beryllium copper having good workability and superior sliding ability, it achieves superior mass-productivity, low cost and superior durability in starting and stopping.

On the other hand, since the depth of the dynamic groove generating groove is set in a range of 2 to 8 $\mu$m, machining of the dynamic pressure generating groove 17 by plastic working, such as ball rolling process or the like, can be facilitated.

Furthermore, by providing Vickers hardness Hv greater than or equal to 300 for the sleeve 12 with beryllium copper, start-stop durability can be improved. Particularly, when age hardening process or the like is effected for providing Vickers hardness Hv greater than or equal to 300 after providing the dynamic pressure generating groove 17 by plastic working, such as ball rolling process or the like, start-stop durability can be enhanced without sacrificing workability, namely, mass-productivity.

Fourth Embodiment

Figure 3:
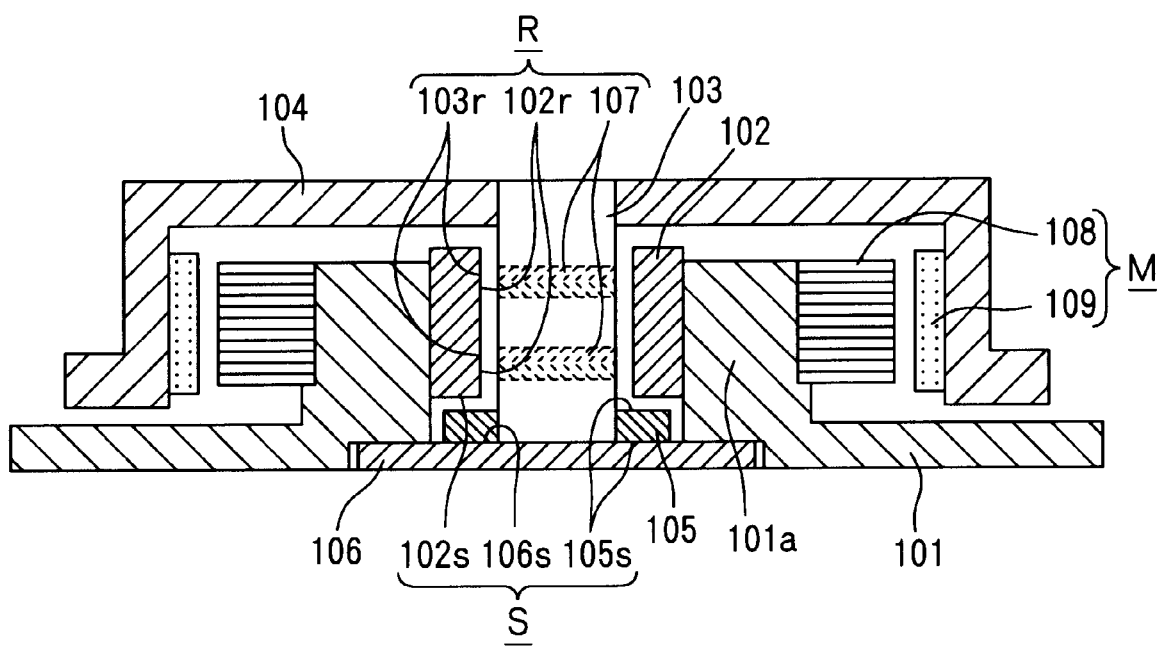
FIG. 3 is a section showing a construction of a spindle motor as the fourth embodiments of a fluid bearing device according to the present invention.

FIG. 3 is a section of the spindle motor as the fourth embodiment of the fluid bearing device according to the present invention.

In the spindle motor, a cylindrical portion 101a is vertically extended from a base 101. On the cylindrical portion 101a, a sleeve 102 is fixed. A shaft 103 is rotatably inserted into the sleeve 102. On the upper end of the shaft 103, a reversed cup-shaped hub 104 is integrally mounted. Between the shaft 103 and the sleeve 102, a dynamic pressure fluid bearing portion is interposed. Namely, on the lower end of the shaft 103, a disk shaped thrust plate 105 is secured by press fitting or other ways. Both planar surfaces of the thrust plate 105 serves as thrust receiving surface 105s of a thrust fluid bearing S.

To the thrust receiving surface 105s on the upper surface side, a lower end surface of the sleeve 102 as a counterpart member is placed in opposition. The lower end surface of the sleeve 102 serves as the thrust bearing surface 102s of the thrust fluid bearing S. On the other hand, below the thrust plate 105, a counter plate 106 as another counterpart member is arranged. The counter plate 106 is fixed to the base 101. The upper surface of the counter plate 106 is placed in opposition to the thrust receiving surface 105s on the lower surface side of the thrust plate 105 to form thrust bearing surface 106s of the thrust fluid bearing S.

At least one of the thrust receiving surfaces 105s and the thrust bearing surfaces 102s and 106s, a thrust fluid bearing S having a not shown herringbone type or spiral type groove for generating a dynamic pressure, is constructed. Materials of the sleeve 102, the shaft 103, the thrust plate 105 the counter plate 106 and so forth will be discussed later.

Furthermore, on the outer peripheral surface of the shaft 103, a pair of radial receiving surface 103r is formed. In opposition to the radial receiving surface 103r, a radial bearing surface 102r is formed on the inner peripheral surface of the sleeve 102. At least one of the radial receiving surface 103r and the radial receiving surface 102r has a herringbone type groove 107 for generating dynamic pressure for example, to form a radial fluid bearing R.

On the outer periphery of the cylindrical portion 101a, a stator 108 having a laminated silicon steel plate and winding wire, is fixed. The stator 108 opposes with a rotor magnet 109 fixed on the lower side of the inner peripheral surface of the hub 104 across a gap over the entire circumference to form a drive motor M for driving the shaft 103 and the hub 104 for rotation in integral manner.

When the shaft 103 is driven to rotate, by pumping action of respective grooves for generating dynamic pressure of the thrust fluid bearing S and the radial fluid bearing R, dynamic pressure is generated in lubricant in bearing clearances of the fluid bearings S and R. The shaft 103 is supported in non-contact manner with the sleeve 102 and the counter plate 106.

In the shown embodiment, materials of the components forming the thrust fluid bearing S are selected in the following manner Also, as a material for the thrust plate 105, copper alloy which can be easily processed by plastic working by coining is suitable.

As the material of the counter plate 106 as the counterpart member having the thrust bearing surface 106s opposing to the thrust receiving surface 105s of the thrust plate 105, beryllium copper, stainless steel or ceramic or the like having high hardness can be used while machining cost becomes high. In contrast to this, the material of the sleeve 102 as another counterpart member having the thrust bearing surface 102s may be free cutting brass of highly workable as in the prior art.

The reason is as follow. In case of HDD for the notebook type personal computer, in actual use condition, it is used in placing on the desk. Therefore, what is in contact to be mainly loaded the axial load upon starting and stopping, is the thrust bearing surface 105s on the lower side of the thrust plate 105 of FIG. 3. Accordingly, by using the material having high hardness and high sliding ability in superior start-stop durability while machining cost is slightly high, actual life time would be sufficient. Furthermore, using low cost material in the other counterpart member, cost down as much as possible can be achieved.

It is also possible to provide surface treatment instead of using the material having high hardness and high sliding ability. For example, as the material of the counter plate 106, free cutting brass, phosphor bronze, lead bronze cast or aluminum alloy having high free cutting ability while hardness is low, is used with nickel plating or DLC (diamond like carbon) layer is coated on the surface (thrust bearing surface 106s) for providing higher hardness and higher sliding ability while machining cost becomes higher. Similarly to case where the counter plate 106 is formed with high hardness and high sliding ability material, sufficiently long life period can be obtained with achieving cost down as much as possible.

As a thickness of surface treatment, in order to reduce fluctuation of dimensional precision of the bearing surface, it is preferred that the thickness of the surface treatment layer is less than or equal to 3 $\mu$m. Thus, even when the fluctuation is one third of the thickness of the layer, fluctuation of dimensional precision can be restricted to be less than or equal to 1 $\mu$m.

Fifth Embodiment

Figure 4:
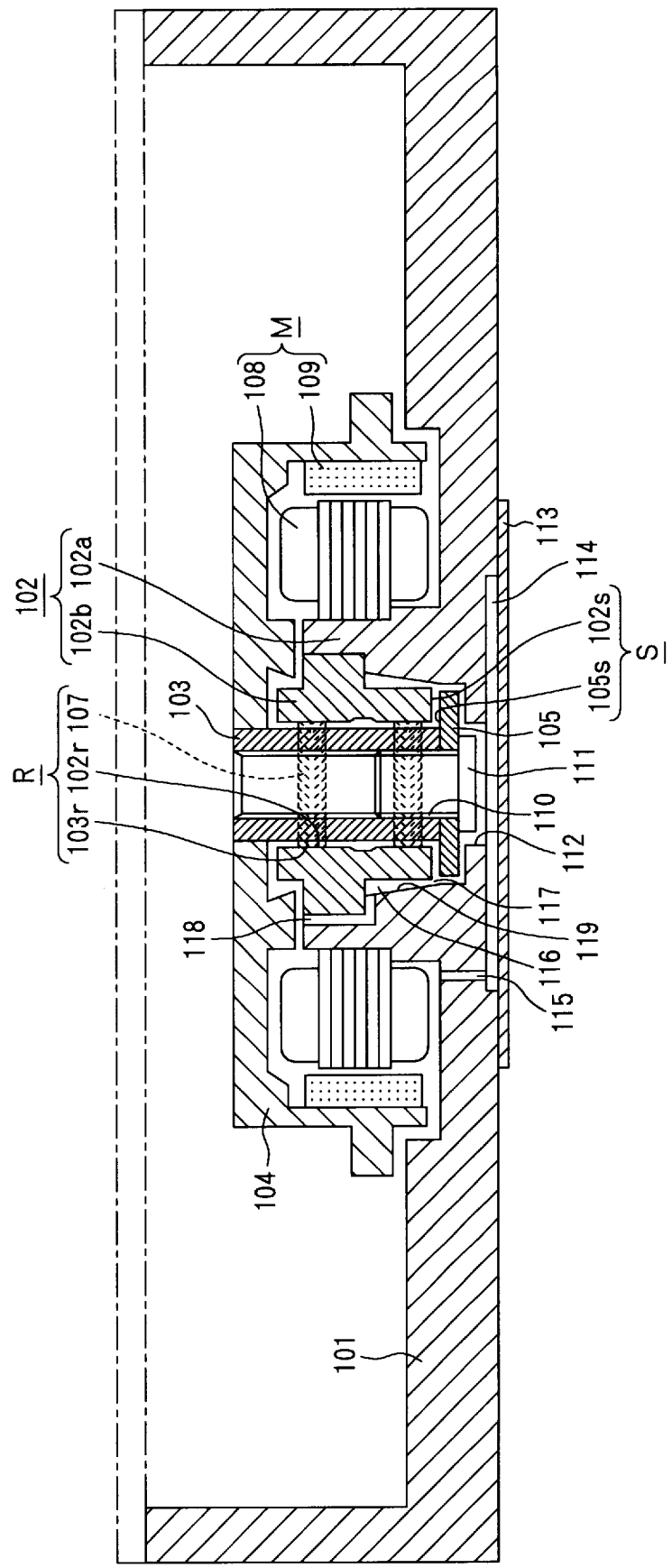
FIG. 4 is a section showing a construction of a spindle motor as the fifth embodiments of a fluid bearing device according to the present invention.

FIG. 4 is a section of the spindle motor of the fifth embodiment of the fluid bearing device according to the present invention. In FIG. 4, like components to those in FIG. 3 would be identified by like reference numerals. Disclosure for such common components will be omitted for avoiding redundant discussion and whereby keeping the disclosure simple enough to facilitate clear understanding of the invention.

In the shown embodiment, the sleeve 102 has a double sleeve structure with an outer sleeve 102a and an inner sleeve 102b. The outer sleeve 102a is integrally extended from the base 101. On the inner peripheral surface, the cylindrical inner sleeve 102b with flange is fixed by the flange portion.

On the other hand, the position of the rotor magnet 109 of the drive motor M, mounted on the inner peripheral wall of the hub 104 is slightly offset downwardly with respect to the stator 108 fixed on the outer peripheral wall of the outer sleeve 102a to upwardly draw the hub with respect to the base 101 by a magnetic force. Therefore, upon starting and stopping, irrespective of use attitude of the device, the thrust bearing surface 102s of the sleeve 102 and the upper thrust receiving surface 105s of the thrust plate 105 are mainly contact slidingly.

With such construction, by using beryllium copper or the like having high hardness and high sliding ability for the inner sleeve 102b or, in the alternative, by copper alloy, phosphor bronze or lead bronze cast and so forth which have low hardness and high workability and coating nickel plating or DLC layer on the surface (particularly on the thrust bearing surface 102s which contacts upon starting and stopping to act axial load) which has high hardness and high sliding ability while machining cost becomes high, wearing due to repetition of starting and stopping can be reduced and whereby expand lift time. Particularly, when beryllium copper processed by age hardening process is used for the inner sleeve 102b, hardness of Vickers hardness Hv greater than or equal to 200 can be certainly provided to reduce wearing not only in the thrust bearing surface 102s but also in the radial bearing surface 102r.

It should be noted that age hardening process of the beryllium copper may be implemented in the material. However, the material processed by age hardening process has high hardness to cause difficult in machining for forming the dynamic pressure generating groove by ball rolling process on the inner peripheral surface of the inner sleeve. Therefore, it may facilitate machining for achieving superior mass-productivity that finishing process is performed for the material before providing age hardening process with a dimension taking a predetermined shrinkage amount into account so that the material falls within the predetermined dimensional precision after age hardening process.

On the other hand, with integrating the outer sleeve 102a and the base 101, aluminum alloy, aluminum die cast, magnesium alloy, magnesium injection molded product, copper alloy, which are low in machining cost, plastic injection molded product and so forth may be used superior in cutting ability and mass-productivity.

Namely, in case of the fifth embodiment, for the inner sleeve 102b, the material having high hardness and high sliding ability while workability is slightly lower is used or the material having low hardness and high workability is used with providing surface treatment having high hardness and high sliding ability on the surface thereof. For the outer sleeve 102a/base 101, the material having high workability and low cost can be used even by sacrificing sliding ability for achieving improvement of start-stop durability and cost down.

It should be noted that in the shown embodiment, the shaft 103 is hollow, and female thread 110 is formed on the inner peripheral surface. Then, on the lower end surface of the shaft extending through the inner sleeve 102b, the disk-shaped thrust plate 105 is fixed by thread engagement of the fastening screw 111. With employing the fastening structure by means of fastening screw, in comparison with the structure by press fitting of the thrust plate to the shaft (see FIG. 3), push-out force can be certainly provided irrespective of difference of the material between the shaft and the thrust plate and surface precision of fixing portion to provide superior strength and reliability. On the other hand, upon machining by coining the dynamic pressure generating groove on the thrust receiving surface 105s of the thrust plate 105, copper type material having low molding pressure and high moldability can be used.

In case of this embodiment, the counter plate as lower counterpart member becomes unnecessary. However, the base 101 beneath the thrust plate 105 is provided with a through opening 112 receiving the head portion of the fastening screw 111 beneath the shaft 103. By providing the through opening 112, filling of lubricant to the fluid bearing portion even after assembling can be facilitated.

In this case, as assembled in a magnetic hard disk drive (shown by one-dotted line is FIG. 4), for preventing penetration of dust or dirt within the bearing from outside through the through opening 112, a cover plate 113 is fixed on the bottom of the base 101 for closing. On the other hand, it is possible that the lubricant held within the bearing clearance can be pushed out due to variation of internal pressure, such as expansion of air in the clearance of the through opening 112 upon occurrence of temperature variation during use of the spindle motor. In order to prevent this, an air communication hole 115 for communication between the clearance of the through opening 112 and the space 114 between the base 101 and the cover plate 113 with the inside of the magnetic hard disk drive, is provided in the base 101.

It should be noted that filling of the lubricant is performed under vacuum pressure, for example, and fixing between the shaft 103 and the hub 104 is performed after assembling of bearing, the through opening 112 is not always required. When the through opening 112 is not provided, some measure has to be taken so that the head of the fastening screen for fixing the thrust plate 105 will not be projected or the thrust plate 105 is fixed to the shaft 103 by press fitting.

Also, when the sleeve 102 takes the double sleeve structure with the inner and outer sleeves, a clearance between the inner sleeve 102b and the outer sleeve 102a serves as an annular lubricant reservoir 116. Below the lubricant reservoir 116, a lubricant supply passage 117 is opened between the thrust fluid bearing S and the radial fluid bearing R. Size of the opening of the lubricant supply passage 117 is equal to or slightly greater than the bearing clearance of respective fluid bearing and holds the lubricant by capillarity based on surface tension. Upper end side of the lubricant supply passage 117 is closed by the flange of the inner sleeve 102b but is communicated with outside by providing an air communication hole 118.

On the other hand, the inner wall (and/or the outer wall of the inner sleeve 102b) of the outer sleeve 102a surrounding the lubricant reservoir 116 is formed into a tapered surface 119 so that the clearance of the lubricant reservoir 116 is gradually narrowed toward the lubricant supply passage 117 for smoothing lubricant supply to the bearing clearance.

Other construction, operation and effects are the same as those in the fourth embodiment.

Sixth Embodiment

Figure 5:
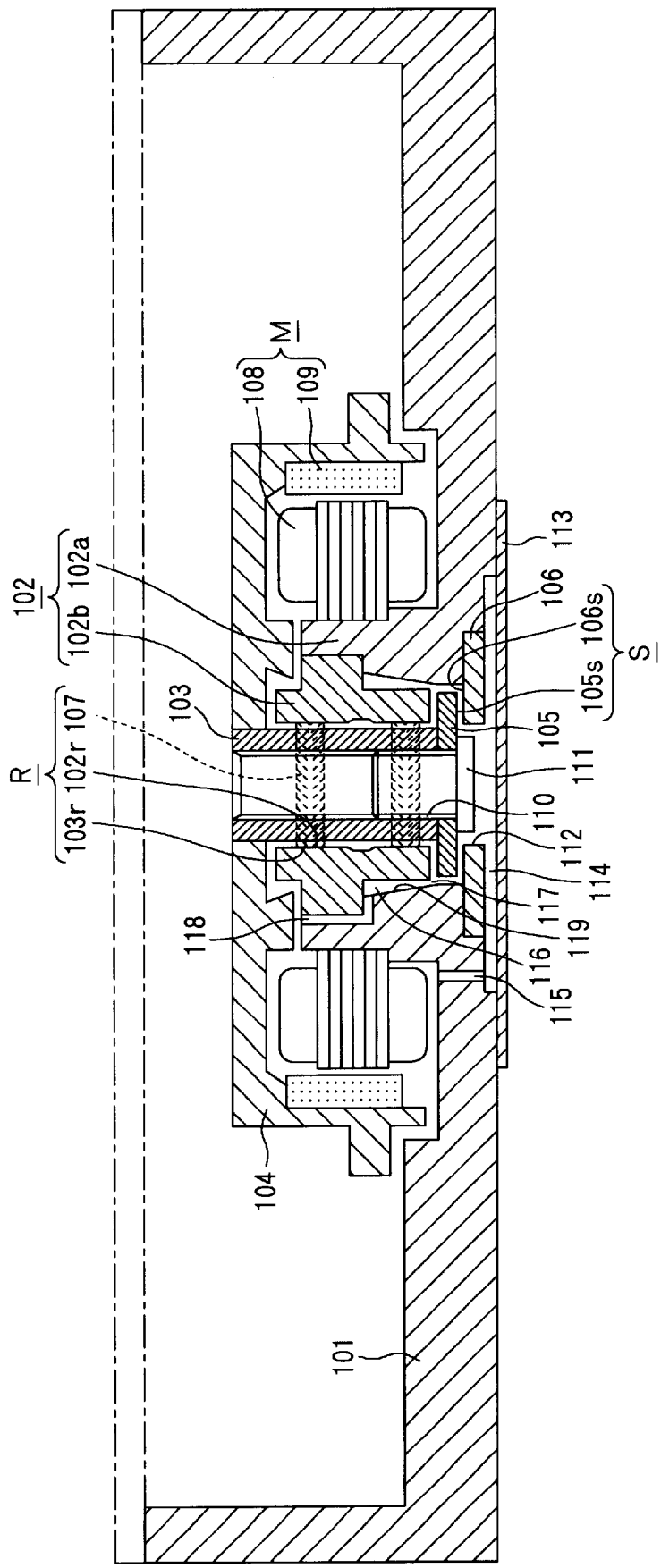
FIG. 5 is a section showing a construction of a spindle motor as the sixth embodiments of a fluid bearing device according to the present invention.

FIG. 5 is a section of the spindle motor as the sixth embodiment of the fluid bearing device according to the present invention. The construction of the sixth embodiment of the spindle motor is substantially the same as the construction of the fifth embodiment of the spindle motor and discussion will be given only for different portion. In FIG. 5, like components to those in FIG. 4 would be identified by like reference numerals. Disclosure for such common components will be omitted for avoiding redundant discussion and whereby keeping the disclosure simple enough to facilitate clear understanding of the invention.

In the shown embodiment, conversely to the fifth embodiment, the rotor magnet 109 of the drive motor M is upwardly offset to the stator 108. By this, magnetic drawing force is directed downwardly, the lower thrust receiving surface 105s of the thrust plate 105 and the thrust bearing surface 106s of the counter plate 106 are mainly slid upon starting and stopping.

In this case, the counter plate 106 fixing to the base 101 is formed with beryllium copper (beryllium copper with age hardening process having Vickers hardness Hv greater than or equal to 200 is particularly preferable) having high sliding ability or stainless steel or the like. In the alternative, copper alloy, phosphor bronze or lead bronze cast and so forth which have low hardness and high workability is used with surface treatment for providing nickel plating or DLC layer on the surface (particularly on the thrust bearing surface 106s which contacts upon starting and stopping to act axial load) which has high hardness and high sliding ability. Since the counter plate 106 has a simple plate form, different from the material of the inner sleeve 102b which has complicated shape, it is possible to select the material having high sliding ability while workability is slightly lower. Also, surface treatment such as resin coating, plating or DLC layer can be easily performed.

On the other hand, since copper type material which has low hardness and high workability can be used for the thrust plate, the dynamic pressure generating groove can be formed on the thrust receiving surface 105s by coining to achieve high mass-production ability and low cost. Also, by providing the dynamic pressure generating groove on the side of the material having lower hardness, possibility of damaging the counterpart member having higher hardness can be significantly reduced. This is quire preferable in viewpoint of improvement start-stop durability.

It should be noted that the material of the sleeve 102, particularly the inner sleeve 102b, phosphor bronze, high strength brass, beryllium copper (raw material having Vickers hardness Hv less than 200) and so forth may be used in place of free cutting brass. Also, the structure thereof may be modified arbitrarily.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

For instance, while the foregoing embodiments have been discussed in terms of the spindle motor as the fluid bearing device, the present invention is also applicable for other kind of fluid bearing device.

Also, the structure of the fluid bearing, structure of the air communication holes 23, 118, structure of the lubricant reservoir 22, 116, structure and presence or absence of the through opening 26, groove pattern for generating dynamic pressure, detailed structure of the spindle motor are not limited to the foregoing embodiments but can be modified in various ways as required or arbitrarily.

As set forth above, the fluid bearing device according to the present invention achieved superior mass-productivity since the flange portion and the sleeve are formed of copper alloy having high cutting ability.

Since the flange portion and the sleeve are formed with the copper alloys mutually having different compositions, high workability in formation of the dynamic pressure generating groove can be achieved for accomplishing high mass-production ability by machining the dynamic pressure generating groove on one of the flange portion and the sleeve having lower hardness. In addition, fine burr or bulged portion around the groove formed during machining of the groove, can be completely removed for successfully preventing damaging of the bearing surfaces of the member, to which the flange portion or the sleeve contact due to repeated staring and stopping of the bearing.

Furthermore, in the fluid bearing device according to the present invention, since the sleeve is formed with the copper alloy having high workability and sliding ability and having Vickers hardness Hv greater than equal to 180 (more preferably the copper alloy having Vickers hardness Hv greater than or equal to 200), such as beryllium copper, high strength bronze, aluminum bronze or the like to achieve higher mass-production ability and low cost.

Furthermore, the fluid bearing device according to the present invention sets the dynamic pressure generating groove in a range of 2 to 10 μm, the groove can be formed by plastic working, such as ball rolling process.

Furthermore, in the fluid bearing device according to the present invention, since the flange is rigidly fixed to the counterpart member by thread fastening, superior impact resistance is achieved.

Also, the fluid bearing device according to the invention has the sleeve and the counterpart member of mutually different material or hardness. The plane surface of the sleeve opposes one of the plane surfaces of the flange portion via the fluid bearing clearance of the thrust bearing, and at least one of the plane surfaces of the sleeve and the counterpart member is provided surface treatment.

Accordingly, the fluid bearing device of the present invention may achieve lower cost with satisfactorily high start-stop durability comparable with that in the prior art, by forming both of the sleeve and the counterpart member with the material having high hardness and sliding ability or by providing surface treatment for higher hardness and higher sliding ability.

Furthermore, the fluid bearing device of the present invention contains the lubricant containing 0.1 to 5 Wt % of antioxidant in the fluid bearing clearance of the radial fluid bearing and the fluid bearing clearance of the thrust fluid bearing.

Accordingly, lubricant and the copper alloy will hardly cause reaction, and reduction of lubricant due to evaporation at high temperature can be eliminated.

What is claimed is:

1. A fluid bearing device comprising:
   a shaft having a flange portion;
   a sleeve opposing the shaft across a radial fluid bearing clearance; and
   a counterpart plate opposing one plane of said flange portion across an axial fluid bearing clearance,
   wherein said flange portion and said sleeve are formed of copper alloys of mutually different compositions and the copper alloy forming the sleeve has a Vickers hardness Hv of 180 or higher.

2. A fluid bearing device as set forth in claim 1, wherein the copper alloy forming said sleeve is a copper alloy having a Vickers hardness Hv 200 or higher.

3. A fluid bearing device as set forth in claim 1, wherein said copper alloy is selected from the group consisting of beryllium copper, high strength brass and aluminum bronze.

4. A fluid bearing device as set forth in claim 2, wherein said copper alloy is selected from the group consisting of beryllium copper, high strength brass and aluminum bronze.

5. A fluid bearing device as set forth in any one of claim 1–4, wherein said counterpart plate is formed of a copper alloy.

6. A fluid bearing device as set forth in any one of claims 1–4, wherein a dynamic pressure generating groove of a depth in a range of 2 to 10 ☐m forming said radial fluid bearing, is provided on an inner periphery of said sleeve.

7. A fluid bearing device as set forth in claim 5, wherein a dynamic pressure generating groove of a depth in a range of 2 to 10 μm forming said radial fluid bearing, is provided on an inner periphery of said sleeve.

8. A fluid bearing device as set forth in any one of claims 1–4, wherein said flange portion is fixed to said shaft by threading.

9. A fluid bearing device as set forth in claim 5, wherein said flange portion is fixed to said shaft by threading.

10. A fluid bearing device as set forth in claim 6, wherein said flange portion is fixed to said shaft by threading.

11. A fluid bearing device as set forth in any one of claims 1–4, wherein said sleeve and said counterpart plate are mutually different in material or hardness.

12. A fluid bearing device as set forth in claim 5, wherein said sleeve and said counterpart plate are mutually different in material or hardness.

13. A fluid bearing device as set forth in claim 6, wherein said sleeve and said counterpart plate are mutually different in material or hardness.

14. A fluid bearing device as set forth in claim 8, wherein said sleeve and said counterpart plate are mutually different in material or hardness.

15. A fluid bearing device as set forth in any one of claims 1–4, wherein a plane of said sleeve opposes one plane of said flange portion across an axial fluid bearing clearance, a plane of said counterpart plate opposes another plane of said flange portion across an axial fluid bearing clearance, and a wear resistance layer is provided on at least one of the surfaces of said plane of said sleeve and said plane of said counterpart plate.

16. A fluid bearing device as set forth in claim 5, wherein a plane of said sleeve opposes one plane of said flange portion across an axial fluid bearing clearance, a plane of said counterpart plate opposes another plane of said flange portion across an axial fluid bearing clearance, and a wear resistance layer is provided on at least one of the surfaces of said plane of said sleeve and said plane of said counterpart plate.

17. A fluid bearing device as set forth in claim 6, wherein a plane of said sleeve opposes one plane of said flange portion across an axial fluid bearing clearance, a plane of said counterpart plate opposes another plane of said flange portion across an axial fluid bearing clearance, and a wear resistance layer is provided on at least one of the surfaces of said plane of said sleeve and said plane of said counterpart plate.

18. A fluid bearing device as set forth in claim 8, wherein a plane of said sleeve opposes one plane of said flange portion across an axial fluid bearing clearance, a plane of said counterpart plate opposes another plane of said flange portion across an axial fluid bearing clearance, and a wear resistance layer is provided on at least one of the surfaces of said plane of said sleeve and said plane of said counterpart plate.

19. A fluid bearing device as set forth in claim 11, wherein a plane of said sleeve opposes one plane of said flange portion across an axial fluid bearing clearance, a plane of said counterpart plate opposes another plane of said flange portion across an axial fluid bearing clearance, and a wear resistance layer is provided on at least one of the surfaces of said plane of said sleeve and said plane of said counterpart plate.

20. A fluid bearing device as set forth in any one of claims 1–4, wherein the radial fluid bearing clearance and the axial fluid bearing clearance are filled with lubricant containing 0.1 to 5.0 Wt % of antioxidant.

21. A fluid bearing device as set forth in claim 5, wherein the radial fluid bearing clearance and the axial fluid bearing clearance are filled with lubricant containing 0.1 to 5.0 Wt % of antioxidant.

22. A fluid bearing device as set forth in claim 6, wherein the radial fluid bearing clearance and the axial fluid bearing clearance are filled with lubricant containing 0.1 to 5.0 Wt % of antioxidant.

23. A fluid bearing device as set forth in claim 8, wherein the radial fluid bearing clearance and the axial fluid bearing clearance are filled with lubricant containing 0.1 to 5.0 Wt % of antioxidant.

24. A fluid bearing device as set forth in claim 11, wherein the radial fluid bearing clearance and the axial fluid bearing clearance are filled with lubricant containing 0.1 to 5.0 Wt % of antioxidant.

25. A fluid bearing device as set forth in claim 14, wherein the radial fluid bearing clearance and the axial fluid bearing clearance are filled with lubricant containing 0.1 to 5.0 Wt % of antioxidant.

* * * * *